(12) United States Patent
Krishna et al.

(10) Patent No.: US 7,600,131 B1
(45) Date of Patent: Oct. 6, 2009

(54) DISTRIBUTED PROCESSING IN A CRYPTOGRAPHY ACCELERATION CHIP

(75) Inventors: Suresh Krishna, Sunnyvale, CA (US); Christopher Owen, Los Gatos, CA (US); Derrick C. Lin, San Mateo, CA (US); Joseph J. Tardo, Palo Alto, CA (US); Patrick Law, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 777 days.

(21) Appl. No.: 09/610,798

(22) Filed: Jul. 6, 2000

Related U.S. Application Data

(60) Provisional application No. 60/159,011, filed on Oct. 12, 1999, provisional application No. 60/142,870, filed on Jul. 8, 1999.

(51) Int. Cl.
*H04L 9/00* (2006.01)

(52) U.S. Cl. .................. 713/192; 713/153; 370/389

(58) Field of Classification Search ............... 713/178, 713/176, 200, 153, 155, 160, 168, 170, 162, 713/201; 705/41, 44, 96, 1, 34; 380/24, 380/21, 25, 30, 23, 49, 28, 37, 270, 259, 380/3–4; 370/503, 351, 352, 353; 709/250, 709/245, 227, 317
See application file for complete search history.

(56) References Cited

U.S. PATENT DOCUMENTS

| | | | |
|---|---|---|---|
| 4,491,909 A | 1/1985 | Shimizu | |
| 4,774,706 A | 9/1988 | Adams | |
| RE33,189 E | 3/1990 | Lee | |
| 5,161,193 A | 11/1992 | Lampson et al. | |
| 5,297,206 A | 3/1994 | Orton | 380/30 |
| 5,329,623 A | 7/1994 | Smith et al. | |
| 5,365,589 A | 11/1994 | Gutowitz | |

(Continued)

FOREIGN PATENT DOCUMENTS

EP 0876026 A2 11/1998

(Continued)

OTHER PUBLICATIONS

"Secure Products VMS115", VLSI Technology, Inc., Printed in USA, Document Control: VMS115, VI, 0, Jan. 1999, pp. 1-2.

(Continued)

*Primary Examiner*—Charles Rones
*Assistant Examiner*—Belix M Ortiz
(74) *Attorney, Agent, or Firm*—Sterne Kessler Goldstein & Fox, P.L.L.C.

(57) ABSTRACT

Provided is an architecture for a cryptography accelerator chip that allows significant performance improvements over previous prior art designs. In various embodiments, the architecture enables parallel processing of packets through a plurality of cryptography engines and includes a classification engine configured to efficiently process encryption/decryption of data packets. Cryptography acceleration chips in accordance may be incorporated on network line cards or service modules and used in applications as diverse as connecting a single computer to a WAN, to large corporate networks, to networks servicing wide geographic areas (e.g., cities). The present invention provides improved performance over the prior art designs, with much reduced local memory requirements, in some cases requiring no additional external memory. In some embodiments, the present invention enables sustained full duplex Gigabit rate security processing of IPSec protocol data packets.

21 Claims, 9 Drawing Sheets

U.S. PATENT DOCUMENTS

| | | | |
|---|---|---|---|
| 5,471,482 A | | 11/1995 | Byers et al. |
| 5,631,960 A | | 5/1997 | Likens et al. |
| 5,734,829 A | * | 3/1998 | Robinson .................... 709/205 |
| 5,751,809 A | | 5/1998 | Davis et al. |
| 5,796,744 A | * | 8/1998 | Krawczak et al. ........... 370/503 |
| 5,796,836 A | * | 8/1998 | Markham .................... 380/28 |
| 5,809,147 A | | 9/1998 | De Lange et al. |
| 5,867,706 A | * | 2/1999 | Martin et al. ................ 718/105 |
| 5,870,474 A | * | 2/1999 | Wasilewski et al. ......... 380/211 |
| 5,870,479 A | | 2/1999 | Feiken et al. |
| 5,933,503 A | | 8/1999 | Schell et al. |
| 5,936,967 A | | 8/1999 | Baldwin et al. ............. 370/474 |
| 5,943,338 A | | 8/1999 | Duclos et al. .......... 370/395.65 |
| 5,949,881 A | | 9/1999 | Davis |
| 5,953,416 A | | 9/1999 | Hasebe et al. |
| 5,983,350 A | | 11/1999 | Minear |
| 6,003,135 A | | 12/1999 | Bialick |
| 6,038,551 A | * | 3/2000 | Barlow et al. .................. 705/41 |
| 6,069,957 A | | 5/2000 | Richards |
| 6,101,255 A | | 8/2000 | Harrison |
| 6,111,858 A | | 8/2000 | Greaves |
| 6,115,816 A | | 9/2000 | Davis |
| 6,157,955 A | | 12/2000 | Narad |
| 6,189,100 B1 | | 2/2001 | Barr et al. |
| 6,216,167 B1 | | 4/2001 | Momirov .................... 709/238 |
| 6,226,710 B1 | | 5/2001 | Melchoir |
| 6,269,163 B1 | | 7/2001 | Rivest |
| 6,295,602 B1 | | 9/2001 | Weissman et al. |
| 6,295,604 B1 | | 9/2001 | Callum |
| 6,320,964 B1 | | 11/2001 | Callum |
| 6,327,625 B1 | | 12/2001 | Wang et al. |
| 6,349,405 B1 | | 2/2002 | Welfeld |
| 6,378,072 B1 | | 4/2002 | Collins et al. |
| 6,393,026 B1 | | 5/2002 | Irwin |
| 6,393,564 B1 | | 5/2002 | Kanemitsu et al. |
| 6,421,730 B1 | | 7/2002 | Narad et al. |
| 6,477,646 B1 | | 11/2002 | Krishna |
| 6,484,257 B1 | | 11/2002 | Ellis |
| 6,493,347 B2 | | 12/2002 | Sindhu et al. |
| 6,529,508 B1 | | 3/2003 | Li et al. |
| 6,701,432 B1 | | 3/2004 | Deng et al. |
| 6,704,871 B1 | | 3/2004 | Kaplan et al. |
| 6,708,273 B1 | | 3/2004 | Ober et al. |
| 6,751,677 B1 | | 6/2004 | Ilnicki et al. |
| 6,751,728 B1 | * | 6/2004 | Gunter et al. ................ 713/153 |
| 6,760,444 B1 | * | 7/2004 | Leung ........................ 380/270 |
| 6,778,495 B1 | | 8/2004 | Blair |
| 6,791,947 B2 | | 9/2004 | Oskouy et al. |
| 6,807,183 B1 | | 10/2004 | Chow et al. |
| 6,831,979 B2 | | 12/2004 | Callum |
| 6,862,278 B1 | * | 3/2005 | Chang et al. ................ 370/389 |
| 6,909,713 B2 | | 6/2005 | Magnussen et al. |
| 6,963,979 B2 | | 11/2005 | Fairclough et al. |
| 6,981,140 B1 | | 12/2005 | Choo |
| 6,983,366 B1 | | 1/2006 | Huynh et al. |
| 6,983,374 B2 | | 1/2006 | Hashimoto et al. |
| 6,996,842 B2 | | 2/2006 | Strahm et al. |
| 7,003,118 B1 | | 2/2006 | Yang et al. |
| 7,005,733 B2 | | 2/2006 | Kommerling et al. |
| 7,017,042 B1 | | 3/2006 | Ziai et al. |
| 7,020,137 B2 | | 3/2006 | Kadambi et al. |
| 7,039,641 B2 | | 5/2006 | Woo |
| 7,055,029 B2 | | 5/2006 | Collins et al. |
| 7,062,657 B2 | | 6/2006 | Law |
| 7,086,086 B2 | | 8/2006 | Ellis |
| 7,191,341 B2 | | 3/2007 | Paaske et al. |
| 7,266,703 B2 | | 9/2007 | Anand et al. |
| 2002/0001384 A1 | | 1/2002 | Buer et al. |
| 2002/0004904 A1 | | 1/2002 | Blaker et al. |
| 2002/0009076 A1 | | 1/2002 | Engbersen et al. |
| 2002/0039418 A1 | | 4/2002 | Dror et al. |
| 2002/0044649 A1 | | 4/2002 | Gallant et al. |
| 2002/0057796 A1 | | 5/2002 | Lambert et al. |
| 2002/0078342 A1 | | 6/2002 | Matthews, Jr. |
| 2002/0085560 A1 | | 7/2002 | Cathey et al. |
| 2002/0097724 A1 | | 7/2002 | Halme et al. |
| 2002/0108048 A1 | | 8/2002 | Qi et al. |
| 2002/0165718 A1 | | 11/2002 | Graumann et al. |
| 2002/0191790 A1 | | 12/2002 | Anand et al. |
| 2003/0005144 A1 | | 1/2003 | Engel |
| 2003/0014627 A1 | | 1/2003 | Krishna et al. |
| 2003/0023846 A1 | | 1/2003 | Krishna et al. |
| 2003/0041252 A1 | | 2/2003 | Fung et al. |
| 2003/0046423 A1 | | 3/2003 | Narad et al. |
| 2003/0084308 A1 | | 5/2003 | Van Rijnswon |
| 2003/0084309 A1 | | 5/2003 | Kohn |
| 2004/0039936 A1 | | 2/2004 | Lai |
| 2004/0054914 A1 | | 3/2004 | Sullivan |
| 2004/0083375 A1 | | 4/2004 | Foster et al. |
| 2004/0098600 A1 | | 5/2004 | Eldeeb |
| 2004/0123096 A1 | | 6/2004 | Buer et al. |
| 2004/0123119 A1 | | 6/2004 | Buer et al. |
| 2004/0123120 A1 | | 6/2004 | Buer et al. |
| 2004/0123123 A1 | | 6/2004 | Buer et al. |

FOREIGN PATENT DOCUMENTS

| | | |
|---|---|---|
| EP | 1132800 A2 | 9/2001 |
| WO | WO 01/80483 | 10/2001 |
| WO | WO 02/41599 A1 | 5/2002 |

OTHER PUBLICATIONS

"VMS115 Data Sheet", VLSI Technology, Inc., a subsidiary of Philips Semiconductors, Revision 2:3, Aug. 10, 1999, pp. 1-64.

"Data Sheet 7751 Encryption Processor", Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-To-Point Encryption (MPPE) Protocol", Microsoft Corporation, Network Working Group, Internet Draft, Oct. 1999, pp. 1-12.

Deutsch, P., "Deflate Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.
Wassal, et al., "A VLSI Architecture for ATM Algorithm-Agile Encryption", Proceedings Ninth Great Lakes Symposium on VLSI, Mar. 4-6, 1999, pp. 325-328.
Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,16,00.html.
3Com: "3Com Launces New Era of Network Connectivity", 3Com Press Release, Jun. 14, 1999, pp. 1-3.
R. Sedgewick, "Algorithms in C—Third Edition", 1998, Addison Wesley XP002163543, pp. 573-608.
"Applied Cryptography, Second Edition", Schneider, B., 1996, John Wiley & Sons, New York, XP002184521, cited in the application, p. 442, paragraph 18.7—p. 445.
"SHA: The Secure Hash Algorithm Putting Message Digests to Work", Stallings, W., Dr. Dobbs Journal, Redwood City, CA, Apr. 1, 1994, p. 32-34, XP000570561.
Deepakumara, J. et al., "FPGA Implementation of MD5 Hash Algorithm," *Conference Proceedings of the Canadian Conference on Electrical and Computer Engineering*, vol. II, pp. 919-924, May 13-16, 2001.
Burnside, M. and Keromytis, A.D., "Accelerating Application-Level Security Protocols," *The 11th IEEE International Conference on Networks*, pp. 313-318, Sep. 28-Oct. 1, 2003.
Jiang, S. et al., "Securing Web servers against Insider Attack," *Proceedings 17th Annual Computer Security Applications Conference*, pp. 265-276, Dec. 10-14, 2001.
"Server ECS", Mar. 9, 1998, [Retrieved from Internet Sep. 2, 2004], "http://home.expertcanmore.net/expert/servers.htm".
IPSec Overview, Jun. 5, 2001, [Retrieved from Internet Sep. 2, 2004], "http://forsitesolutions.com/Techstuff/freeswan/inside_overview.html".
"RFC 2402", Oct. 1998, [Retrieved from Internet Sep. 3, 2004], "http://www.ietf.org/rfc/rfc2402.txt?number=2402".
Shenker, S., "Specification of Guaranteed Quality of Service", Network Working Group, Sep. 1997, pp. 1-20.
Srisuresh, P., et al., "IP Network Address Translator (NAT) Terminology and Considerations", Lucent Technologies, Network Working Group, Aug. 1999, pp. 1-30.
Kent, S., et al., "Security Architecture for the Internet Protocol", Network Working Group, Nov. 1998, pp. 1-66.
Compression for Broadband Data Communications, BlueSteel Networks, Inc., Sep. 8, 1999, pp. 1-9.
Securing and Accelerating e-Commerce Transactions, BlueSteel Networks, Inc., Revision 2.0, Oct. 20, 1999, pp. 1-7.
Securing Broadband Communications BlueSteel Networks, Inc., Sep. 8, 1999, pp. 1-10.
European Search Report, from European Patent Appl. No. 03029195.9, 3 pages, dated Nov. 2, 2005.
Erich Nahum, David J. Yates, Sean O'Malley, Hilarie Orman, and Richard Schroeppel; "Parallelized Network Security Protocols"; 1996 IEEE; pp. 145-154.
Surech et al, "Classification Engine in a Cryptography Acceleration Chip", U.S. Appl. No. 09/610,722, filed Jul. 6, 2000, 43 pgs.
Final Office Action for U.S. Appl. No. 09/610,722, mailed by Examiner Carl Colin on Dec. 3, 2004 (8 pages).
Final Office Action for U.S. Appl. No. 09/610,722, mailed by Examiner Carl Colin on Apr. 25, 2006 (9 pages).
Final Office Action for U.S. Appl. No. 09/610,722, mailed by Examiner Carl Colin on Jul. 30, 2007 (14 pages).
Final Office Action for U.S. Appl. No. 09/610,722, mailed by Examiner Carl Colin on Oct. 24, 2008 (15 pages).
Non-Final Office Action for U.S. Appl. No. 09/610,722, mailed by Examiner Carl Colin on Feb. 12, 2004 (9 pages).
Non-Final Office Action for U.S. Appl. No. 09/610,722, mailed by Examiner Carl Colin on Oct. 5, 2005 (9 pages).
Non-Final Office Action for U.S. Appl. No. 09/610,722, mailed by Examiner Carl Colin on Nov. 7, 2006 (14 pages).
Non-Final Office Action for U.S. Appl. No. 09/610,722, mailed by Examiner Carl Colin on Jan. 23, 2008 (13 pages).
Final Office Action for U.S. Appl. No. 10/218,206, mailed by Examiner Benjamin Lanier on Jul. 18, 2003 (7 pages).
Final Office Action for U.S. Appl. No. 10/218,206, mailed by Examiner Benjamin Lanier on Feb. 3, 2005 (8 pages).
Final Office Action for U.S. Appl. No. 10/218,206, mailed by Examiner Benjamin Lanier on Feb. 21, 2006 (12 pages).
Final Office Action for U.S. Appl. No. 10/218,206, mailed by Examiner Benjamin Lanier on Dec. 5, 2007 (10 pages).
Final Office Action for U.S. Appl. No. 10/218,206, mailed by Examiner Benjamin Lanier on Nov. 7, 2008 (15 pages).
Non-Final Office Action for U.S. Appl. No. 10/218,206, mailed by Examiner Benjamin Lanier on Apr. 3, 2003 (7 pages).
Non-Final Office Action for U.S. Appl. No. 10/218,206, mailed by Examiner Benjamin Lanier on Jul. 19, 2004 (7 pages).
Non-Final Office Action for U.S. Appl. No. 10/218,206, mailed by Examiner Benjamin Lanier on Sep. 19, 2005 (10 pages).
Non-Final Office Action for U.S. Appl. No. 10/218,206, mailed by Examiner Benjamin Lanier on Oct. 31, 2006 (14 pages).
Non-Final Office Action for U.S. Appl. No. 10/218,206, mailed by Examiner Benjamin Lanier on Apr. 26, 2007 (12 pages)..
Non-Final Office Action for U.S. Appl. No. 10/218,206, mailed by Examiner Benjamin Lanier on Jun. 27, 2008 (11 pages).
Non-Final Office Action for U.S. Appl. No. 09/610,722, mailed by Examiner Carl Colin on May 21, 2009 (15 pages).

* cited by examiner

DISTRIBUTED PROCESSING IN A CRYPTOGRAPHY ACCELERATION CHIP

CROSS-REFERENCE TO RELATED APPLICATIONS

This application claims priority from U.S. Provisional Application No. 60/142,870, entitled NETWORKING SECURITY CHIP ARCHITECTURE AND IMPLEMENTATIONS FOR CRYPTOGRAPHY ACCELERATION, filed Jul. 8, 1999; and claims priority from U.S. Provisional Application No. 60/159,011, entitled UBIQUITOUS BROADBAND SECURITY CHIP, filed Oct. 12, 1999, the disclosures of which are herein incorporated by reference herein for all purposes.

This application is related to concurrently-filed U.S. application Ser. No. 10/218,206, entitled CLASSIFICATION ENGINE IN A CRYPTOGRAPHY ACCELERATION CHIP the disclosure of which is incorporated by reference herein for all purposes.

BACKGROUND OF THE INVENTION

The present invention relates generally to the field of cryptography, and more particularly to an architecture and method for cryptography acceleration.

Many methods to perform cryptography are well known in the art and are discussed, for example, in *Applied Cryptography*, Bruce Schneier, John Wiley & Sons, Inc. (1996, $2^{nd}$ Edition), herein incorporated by reference. In order to improve the speed of cryptography processing, specialized cryptography accelerator chips have been developed. For example, the Hi/fn™ 7751 and the VLSI™ VMS115 chips provide hardware cryptography acceleration that out-performs similar software implementations. Cryptography accelerator chips may be included in routers or gateways, for example, in order to provide automatic IP packet encryption/decryption. By embedding cryptography functionality in network hardware, both system performance and data security are enhanced.

However, these chips require sizeable external attached memory in order to operate. The VLSI VMS115 chip, in fact, requires attached synchronous SRAM, which is the most expensive type of memory. The substantial additional memory requirements make these solutions unacceptable in terms of cost versus performance for many applications.

Also, the actual sustained performance of these chips is much less than peak throughput that the internal cryptography engines (or "crypto engines") can sustain. One reason for this is that the chips have a long "context" change time. In other words, if the cryptography keys and associated data need to be changed on a packet-by-packet basis, the prior art chips must swap out the current context and load a new context, which reduces the throughput. The new context must generally be externally loaded from software, and for many applications, such as routers and gateways that aggregate bandwidth from multiple connections, changing contexts is a very frequent task.

Moreover, the architecture of prior art chips does not allow for the processing of cryptographic data at rates sustainable by the network infrastructure in connection with which these chips are generally implemented. This can result in noticeable delays when cryptographic functions are invoked, for example, in e-commerce transactions.

Recently, an industry security standard has been proposed that combines both "DES/3DES" encryption with "MD5/SHA1" authentication, and is known as "IPSec." By incorporating both encryption and authentication functionality in a single accelerator chip, over-all system performance can be enhanced. But due to the limitations noted above, the prior art solutions do not provide adequate performance at a reasonable cost.

Thus it would be desirable to have a cryptography accelerator chip architecture that is capable of implementing the IPSec specification (or any other cryptography standard), at much faster rates than are achievable with current chip designs.

SUMMARY OF THE INVENTION

In general, the present invention provides an architecture for a cryptography accelerator chip that allows significant performance improvements over previous prior art designs. In various embodiments, the architecture enables parallel processing of packets through a plurality of cryptography engines and includes a classification engine configured to efficiently process encryption/decryption of data packets. Cryptography acceleration chips in accordance may be incorporated on network line cards or service modules and used in applications as diverse as connecting a single computer to a WAN, to large corporate networks, to networks servicing wide geographic areas (e.g., cities). The present invention provides improved performance over the prior art designs, with much reduced local memory requirements, in some cases requiring no additional external memory. In some embodiments, the present invention enables sustained full duplex Gigabit rate security processing of IPSec protocol data packets.

In one aspect, the present invention provides a cryptography acceleration chip. The chip includes a plurality of cryptography processing engines, and a packet distributor unit. The packet distributor unit is configured to receive data packets and matching classification information for the packets, and to input each of the packets to one of the cryptography processing engines. The combination of the distributor unit and cryptography engines is configured to provide for cryptographic processing of a plurality of the packets from a given packet flow in parallel while maintaining per flow packet order. In another embodiment, the distributor unit and cryptography engines are configured to provide for cryptographic processing of a plurality of the packets from a plurality of packet flows in parallel while maintaining packet ordering across the plurality of flows.

In another aspect, the invention provides a method for accelerating cryptography processing of data packets. The method involves receiving data packets on a cryptography acceleration chip, processing the data packets and matching classification information for the packets, and distributing the data packets to a plurality of cryptography processing engines for cryptographic processing. The data packets are cryptographically processed in parallel on the cryptography processing engines, and the cryptographically processed data packets are output from the chip in correct per flow packet order. In another embodiment the combination of the distribution and cryptographic processing further maintains packet ordering across a plurality of flows.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
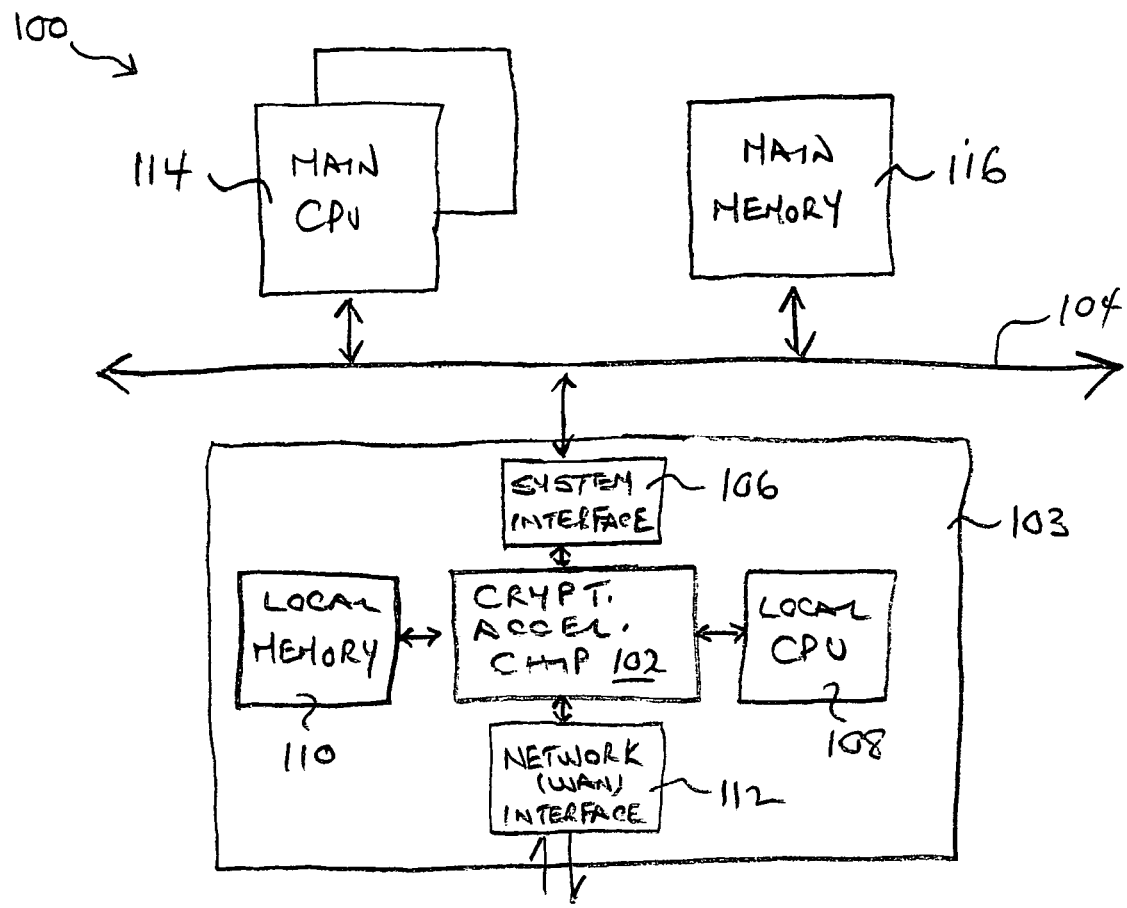
FIGS. 1A and B are high-level block diagrams of systems implementing a cryptography accelerator chip in accordance with one embodiment of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, the present invention provides an architecture for a cryptography accelerator chip that allows significant performance improvements over previous prior art designs. In preferred embodiments, the chip architecture enables "cell-based" processing of random-length IP packets, as described in copending U.S. patent application Ser. No. 09/510,486, entitled SECURITY CHIP ARCHITECTURE AND IMPLEMENTATIONS FOR CRYPTOGRAPHY ACCELERATION, incorporated by reference herein in its entirety for all purposes. Briefly, cell-based packet processing involves the splitting of IP packets, which may be of variable and unknown size, into smaller fixed-size "cells." The fixed-sized cells are then processed and reassembled (recombined) into packets. The cell-based packet processing architecture of the present invention allows the implementation of a processing pipeline that has known processing throughput and timing characteristics, thus making it possible to fetch and process the cells in a predictable time frame. In preferred embodiments, the cells may be fetched ahead of time (pre-fetched) and the pipeline may be staged in such a manner that the need for attached (local) memory to store packet data or control parameters is minimized or eliminated.

Moreover, in various embodiments, the architecture enables parallel processing of packets through a plurality of cryptography engines, for example four, and includes a classification engine configured to efficiently process encryption/decryption of data packets. Cryptography acceleration chips in accordance may be incorporated on network line cards or service modules and used in applications as diverse as connecting a single computer to a WAN, to large corporate networks, to networks servicing wide geographic areas (e.g., cities). The present invention provides improved performance over the prior art designs, with much reduced local memory requirements, in some cases requiring no additional external memory. In some embodiments, the present invention enables sustained full duplex Gigabit rate security processing of IPSec protocol data packets.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The present invention may be implemented in a variety of ways. FIGS. 1A an 1B illustrate two examples of implementations of the invention as a cryptography acceleration chip incorporated into a network line card or a system module, respectively, in a standard processing system in accordance with embodiments of the present invention.

As shown in FIG. 1A, the cryptography acceleration chip 102 may be part of an otherwise standard network line card 103 which includes a WAN interface 112 that connects the processing system 100 to a WAN, such as the Internet, and manages in-bound and out-bound packets. The chip 102 on the card 103 may be connected to a system bus 104 via a standard system interface 106. The system bus 104 may be, for example, as standard PCI bus, or it may be a high speed system switching matrix, as are well known to those of skill in the art. The processing system 100 includes a processing unit 114, which may be one or more processing units, and a system memory unit 116.

The cryptography acceleration chip 102 on the card 103 also has associated with it a local processing unit 108 and local memory 110. As will be described in more detail below, the local memory 110 may be RAM or CAM and may be either on or off the chip 102. The system also generally includes a LAN interface (not shown) which attaches the processing system 100 to a local area network and receives packets for processing and writes out processed packets to the network.

According to this configuration, packets are received from the LAN or WAN and go directly through the cryptography acceleration chip and are processed as they are received from or are about to be sent out on the WAN, providing automatic security processing for IP packets.

In some preferred embodiments the chip features a streamlined IP packet-in/packet-out interface that matches line card requirements in ideal fashion. As described further below, chips in accordance with the present invention may provide distributed processing intelligence that scales as more line cards are added, automatically matching up security processing power with overall system bandwidth. In addition, integrating the chip onto line cards preserves precious switching fabric bandwidth by pushing security processing to the edge of the system. In this way, since the chip is highly autonomous, shared system CPU resources are conserved for switching, routing and other core functions.

One beneficial system-level solution for high-end Web switches and routers is to integrate a chip in accordance with the present invention functionality with a gigabit Ethernet MAC and PHY. The next generation of firewalls being designed today require sustained security bandwidths in the gigabit range. Chips in accordance with the present invention can deliver sustained full duplex multi-gigabit IPSec processing performance.

Figure 1B:
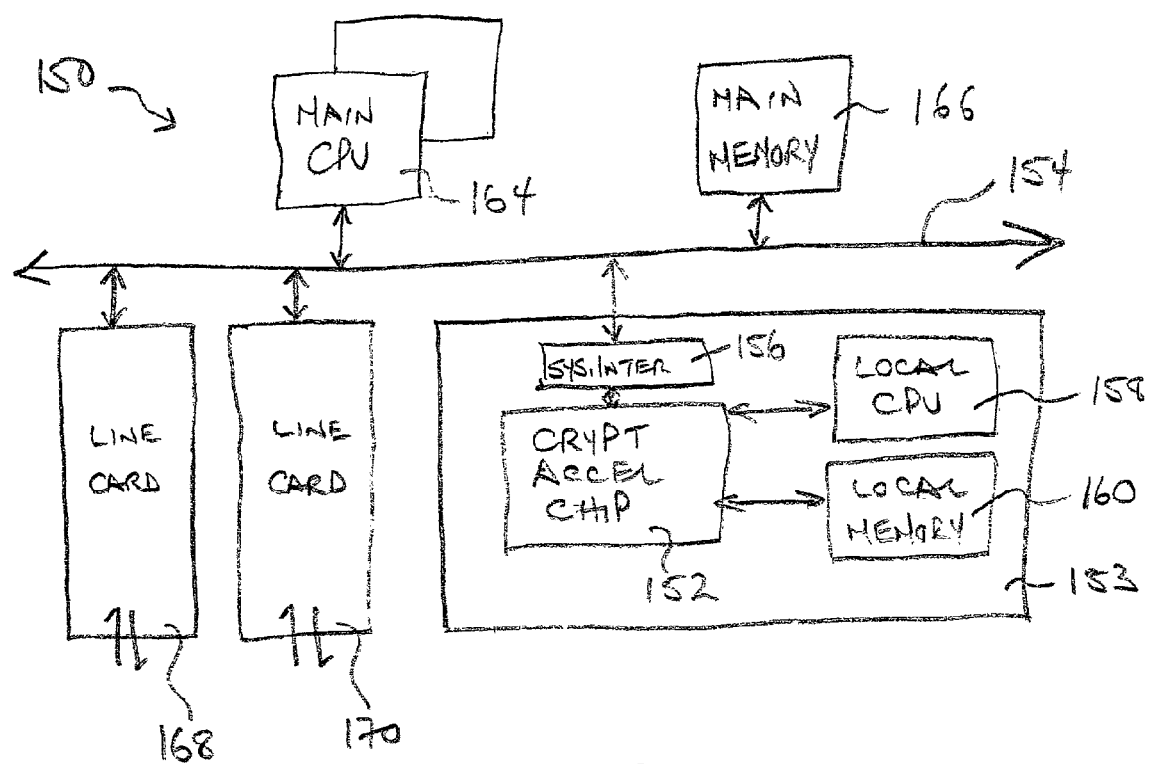

As shown in FIG. 1B, the cryptography acceleration chip 152 may be part of a service module 153 for cryptography acceleration. The chip 152 in the service module 153 may be connected to a system bus 154 via a standard system interface 156. The system bus 154 may be, for example, a high speed system switching matrix, as are well known to those of skill in the art. The processing system 150 includes a processing unit 164, which may be one or more processing units, and a system memory unit 166.

The cryptography acceleration chip 152 in the service module 153 also has associated with it a local processing unit 158 and local memory 160. As will be described in more detail below, the local memory 160 may be RAM or CAM and may be either on or off the chip 152. The system also generally includes a LAN interface which attaches the processing system 150 to a local area network and receives packets for processing and writes out processed packets to the network, and a WAN interface that connects the processing system 150 to a WAN, such as the Internet, and manages in-bound and out-bound packets. The LAN and WAN interfaces are generally provided via one or more line cards 168, 170. The number of line cards will vary depending on the size of the system. For very large systems, there may be thirty to forty or more line cards.

According to this configuration, packets received from the LAN or WAN are directed by the high speed switching matrix 154 to memory 166, from which they are sent to the chip 152 on the service module 153 for security processing. The processed packets are then sent back over the matrix 154, through the memory 166, and out to the LAN or WAN, as appropriate.

Basic Features Architecture and Distributed Processing

Figure 2:
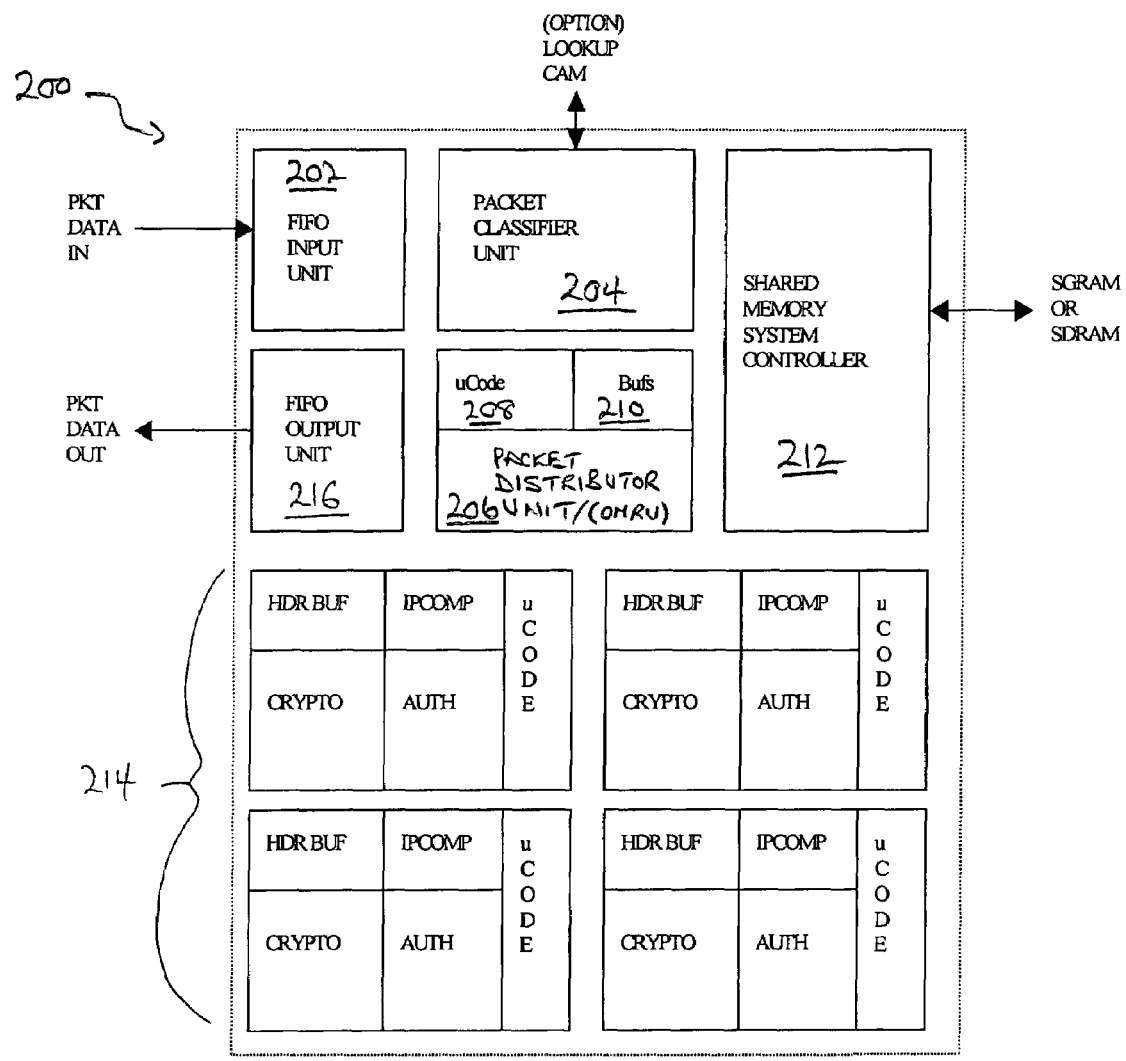
FIG. 2 is a high-level block diagram of a cryptography accelerator chip in accordance with one embodiment the present invention.

FIG. 2 is a high-level block diagram of a cryptography chip architecture in accordance with one embodiment of the present invention. The chip 200 may be connected to external systems by a standard PCI interface (not shown), for example a 32-bit bus operating at up to 33 MHz. Of course, other interfaces and configurations may be used, as is well known in the art, without departing from the scope of the present invention.

Referring to FIG. 2, the IP packets are read into a FIFO (First In First Out buffer) input unit 202. This interface (and the chip's output FIFO) allow packet data to stream into and out of the chip. In one embodiment, they provide high performance FIFO style ports that are unidirectional, one for input and one for output. In addition, the FIFO 202 supports a bypass capability that feeds classification information along with packet data. Suitable FIFO-style interfaces include GMII as well as POS-PHY-3 style FIFO based interfaces, well known to those skilled in the art.

Figure 4:
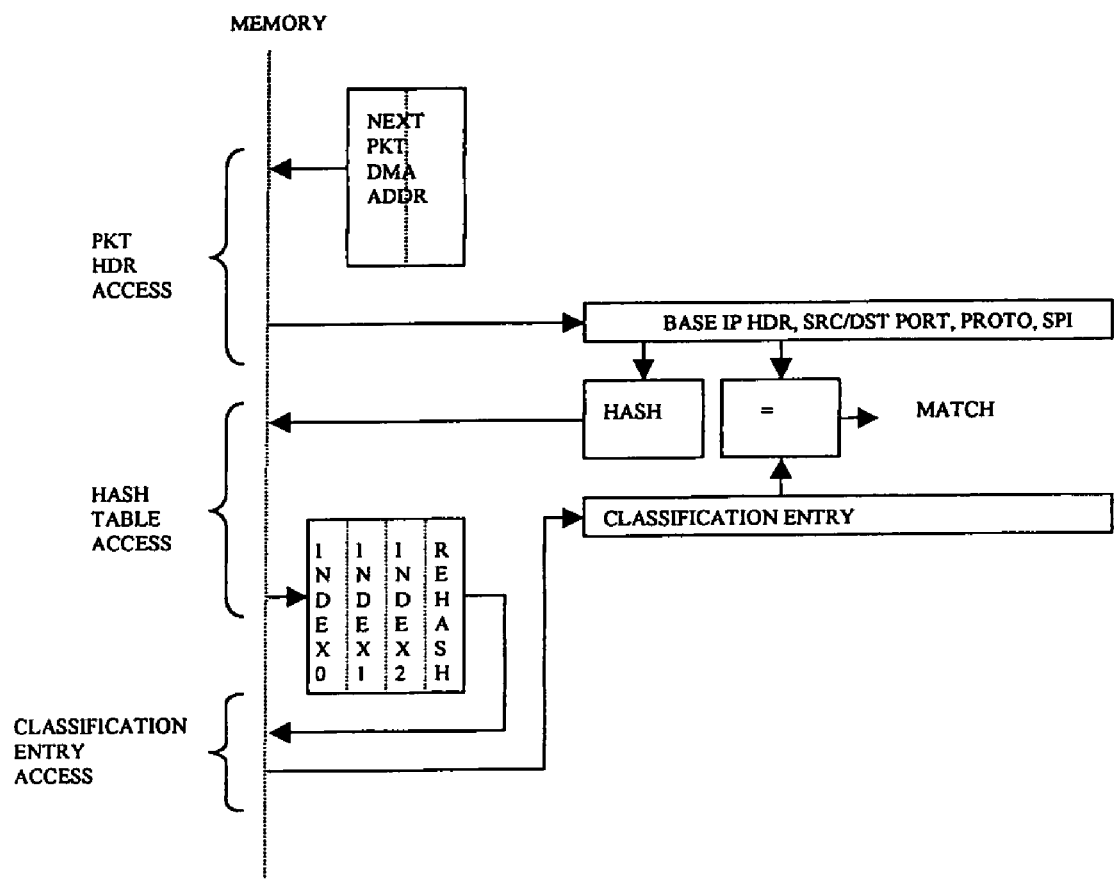
FIG. 4 is a block diagram illustrating a DRAM-based or SRAM-based packet classifier in accordance with one embodiment the present invention.

From the input FIFO 202, packet header information is sent to a packet classifier unit 204 where a classification engine rapidly determines security association information required for processing the packet, such as encryption keys, data, etc. As described in further detail below with reference to FIGS. 4, 5 and 6A and B, the classification engine performs lookups from databases stored in associated memory. The memory may be random access memory (RAM), for example, DRAM or SSRAM, in which case the chip includes a memory controller 212 to control the associated RAM. The associated memory may also be contact addressable memory (CAM), in which case the memory is connected directly with the cryptography engines 216 and packet classifier 204, and a memory controller is unnecessary. The associated memory may be on or off chip memory. The security association information determined by the packet classifier unit 204 is sent to a packet distributor unit 206.

The distributor unit 206 determines if a packet is ready for IPSec processing, and if so, distributes the security association information (SA) received from the packet classifier unit 204 and the packet data among a plurality of cryptography processing engines 214, in this case four, on the chip 200, for security processing. This operation is described in more detail below.

The cryptography engines may include, for example, "3DES-CBC/DES X" encryption/decryption "MD5/SHA1" authentication/digital signature processing and compression/decompression processing. It should be noted, however, that the present architecture is independent of the types of cryptography processing performed, and additional cryptography engines may be incorporated to support other current or future cryptography algorithms. Thus, a further discussion of the cryptography engines is beyond to scope of this disclosure.

Once the distributor unit 206 has determined that a packet is ready for IPSec processing, it will update shared IPSec per-flow data for that packet, then pass the packet along to one of the four cryptography and authentication engines 214. The distributor 206 selects the next free engine in round-robin fashion within a given flow. Engine output is also read in the same round-robin order. Since packets are retired in a round-robin fashion that matches their order of issue packet ordering is always maintained within a flow ("per flow ordering"). For the per-flow ordering case, state is maintained to mark the oldest engine (first one issued) for each flow on the output side, and the newest (most recently issued) engine on the input side; this state is used to select an engine for packet issue and packet retiring. The chip has an engine scheduling module which allows new packets to be issued even as previous packets from the same flow are still being processed by one or more engines. In this scenario, the SA Buffers will indicate a hit (SA auxiliary structure already on-chip), shared state will be updated in the on-chip copy of the SA auxiliary structure, and the next free engine found in round-robin order will start packet processing.

Thus, the distributor 206 performs sequential portions of IPSec processing that rely upon packet-to-packet ordering, and hands off a parallelizable portion of IPSec to the protocol and cryptography processing engines. By providing multiple cryptography engines and processing data packets in parallel chips in accordance with the present invention are able to provide greatly improved security processing performance. The distributor also handles state cleanup functions needed to properly retire a packet (including ensure that packet ordering is maintained) once IPSec processing has completed.

Per-flow ordering offers a good trade-off between maximizing end-to-end system performance (specifically desktop PC TCP/IP stacks), high overall efficiency, and design simplicity. In particular, scenarios that involve a mix of different types of traffic such as voice-over-IP (VoIP), bulk ftp/e-mail, and interactive telnet or web browsing will run close to 100% efficiency. Splitting, if necessary, a single IPSec tunnel into multiple tunnels that carry unrelated data can further enhance processing efficiency.

Per-flow IPSec data includes IPSec sequence numbers, anti-replay detection masks, statistics, as well as key lifetime statistics (time-based and byte-based counters). Note that some of this state cannot be updated until downstream cryptography and authentication engines have processed an entire packet. An example of this is the anti-replay mask, which can only be updated once a packet has been established as a valid, authenticated packet. In one embodiment, the distributor 206 handles these situations by holding up to eight copies of per-flow IPSec information on-chip, one copy per packet that is in process in downstream authentication and crypto engines (each engine holds up to two packets due to internal pipelining). These copies are updated once corresponding packets complete processing.

This scheme will always maintain ordering among IPSec packets that belong to a given flow, and will correctly process packets under all possible completion ordering scenarios.

In addition, in some embodiments, a global flag allows absolute round robin sequencing, which maintains packet ordering even among different flows ("strong ordering"). Strong ordering may be maintained in a number of ways, for example, by assigning a new packet to the next free cryptography processing unit in strict round-robin sequence. Packets are retired in the same sequence as units complete processing, thus ensuring order maintenance. If the next engine in round-robin sequence is busy, the process of issuing new packets to engines is stalled until the engines become free. Similarly, if the next engine on output is not ready, the packet output process stalls. These restrictions ensure that an engine is never "skipped", thus guaranteeing ordering at the expense of some reduced processing efficiency.

Alternatively, strong ordering may be maintained by combining the distributor unit with an order maintenance packet retirement unit. For every new packet, the distributor completes the sequential portions of IPSec processing, and assigns the packet to the next free engine. Once the engine completes processing the packet, the processed packet is placed in a retirement buffer. The retirement unit then extracts processed packets out of the retirement buffer in the same order that the chip originally received the packets, and outputs the processed packets. Note that packets may process through the multiple cryptography engines in out of order fashion; however, packets are always output from the chip in the same order that the chip received them. This is an "out-of-order execution, in-order retirement" scheme. The scheme maintains peak processing efficiency under a wide variety of workloads, including a mix of similar size or vastly different size packets.

Most functions of the distributor are performed via dedicated hardware assist logic as opposed to microcode, since the distributor 206 is directly in the critical path of per-packet processing. The distributor's protocol processor is programmed via on-chip microcode stored in a microcode storage unit 208. The protocol processor is microcode-based with specific instructions to accelerate IPSec header processing.

The chip also includes various buffers 210 for storing packet data, security association information, status information, etc., as described further with reference to FIG. 3, below. For example, fixed-sized packet cells may be stored in payload or packet buffers, and context or security association buffers may be used to store security association information for associated packets/cells.

The output cells are then stored in an output FIFO 216, in order to write the packets back out to the system. The processed cells are reassembled into packets and sent off the chip by the output FIFO 216.

Figure 3:
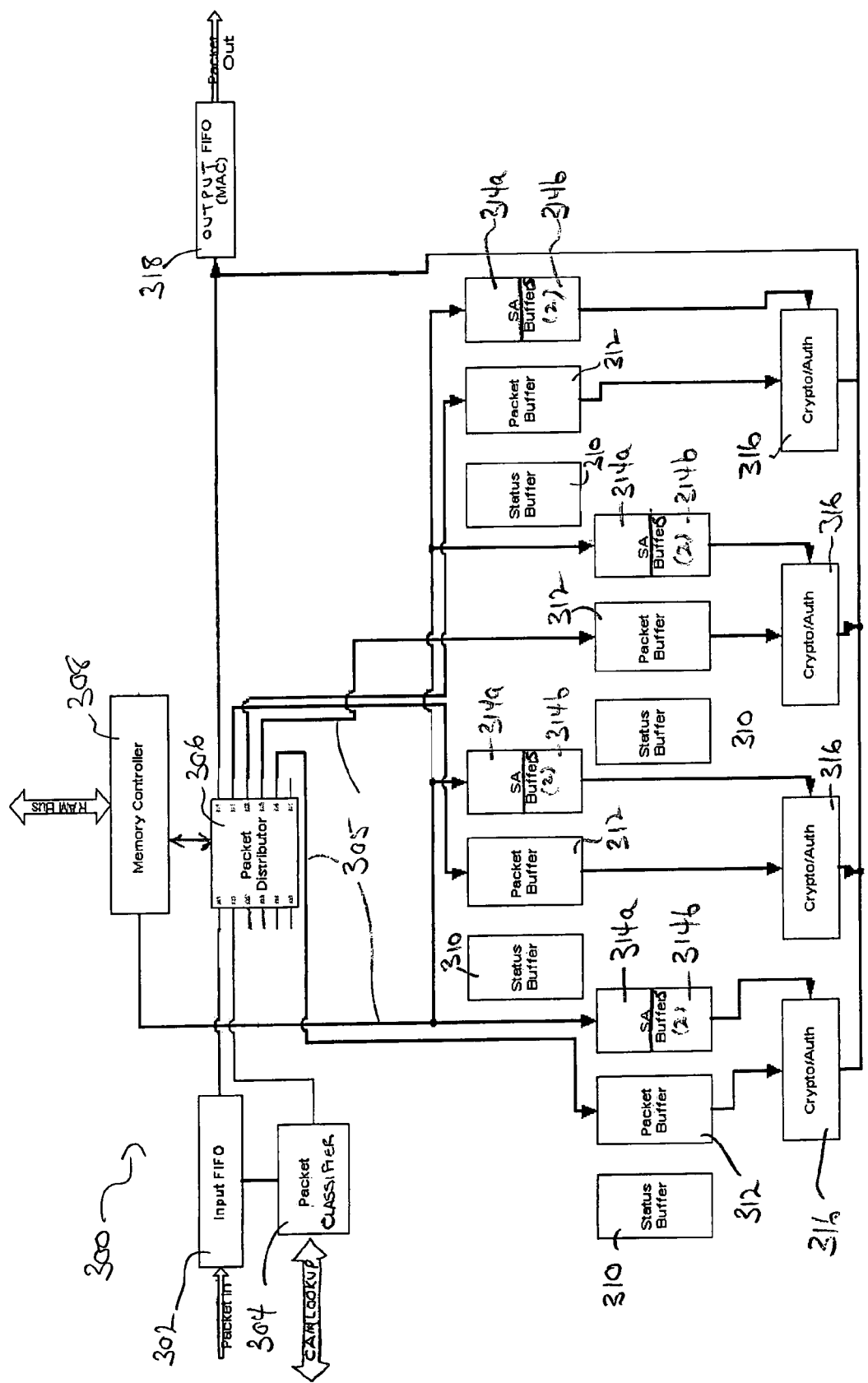
FIG. 3 is a block diagram of a cryptography accelerator chip architecture in accordance with one embodiment of the present invention.

FIG. 3 is a block diagram of a cryptography accelerator chip architecture in accordance with one embodiment of the present invention. The chip 300 includes an input FIFO 302 into which IP packets are read. From the input FIFO 302, packet header information is sent to a packet classifier unit 304 where a classification engine rapidly determines security association information required for processing the packet, such as encryption keys, data, etc. As described in further detail below, the classification engine performs lookups from databases stored in associated memory. The memory may be random access memory (RAM), for example, DRAM or SSRAM, in which case the chip includes a memory controller 308 to control the associated RAM. The associated memory may also be contact addressable memory (CAM), in which case the memory is connected directly with the cryptography engines 316 and packet classifier 304, and a memory controller is unnecessary. The associated memory may be on or off chip memory. The security association information determined by the packet classifier unit 304 is sent to a packet distributor unit 306 via the chip's internal bus 305.

The packet distributor unit 306 then distributes the security association information (SA) received from the packet classifier unit 304 and the packet data via the internal bus 305 among a plurality of cryptography processing engines 316, in this case four, on the chip 200, for security processing. For example, the crypto engines may include "3DES-CBC/DES X" encryption/decryption "MD5/SHA1" authentication/digital signature processing and compression/decompression processing. As noted above, the present architecture is independent of the types of cryptography processing performed, and a further discussion of the cryptography engines is beyond to scope of this disclosure.

The packet distributor unit 306 includes a processor which controls the sequencing and processing of the packets according to microcode stored on the chip. The chip also includes various buffers associated with each cryptography engine 316. A packet buffer 312 is used for storing packet data between distribution and crypto processing. Also, in this embodiment, each crypto engine 316 has a pair of security association information (SA) buffers 314*a*, 314*b* associated with it. Two buffers per crypto engine are used so that one 314*b*, may hold the SA for a current packet (packet currently being processed) while the other 314*a* is being preloaded with the security association information for the next packet. A status buffer 310 may be used to store processing status information, such as errors, etc.

Processed packet cells are reassembled into packets and sent off the chip by an output FIFO 318. The packet distributor 306 controls the output FIFO 318 to ensure that packet ordering is maintained.

Packet Classifier

The IPSec cryptography protocol specifies two levels of lookup: Policy (Security Policy Database (SPD) lookup) and Security Association (Security Association Database (SAD) lookup). The policy look-up is concerned with determining what needs to be done with various types of traffic, for example, determining what security algorithms need to be applied to a packet, without determining the details, e.g., the keys, etc. The Security Association lookup provides the details, e.g., the keys, etc., needed to process the packet according to the policy identified by the policy lookup. The present invention provides chip architectures and methods capable of accomplishing this IPSec function at sustained multiple full duplex gigabit rates.

As noted above, there are two major options for implementing a packet classification unit in accordance with the present invention: CAM based and RAM (DRAM/SSRAM) based. The classification engine provides support for general IPSec policy rule sets, including wild cards, overlapping rules, conflicting rules and conducts deterministic searches in a fixed number of clock cycles. In preferred embodiments, it may be implemented either as a fast DRAM/SSRAM lookup classification engine, or on-chip CAM memory for common situations, with extensibility via off-chip CAM, DRAM or SSRAM. Engines in accordance with some embodiments of the present invention engine are capable of operating at wire-speed rates under any network load. In one embodiment, the classifier processes packets down to 64 bytes at OC12 full duplex rates (1.2 Gb/s throughput); this works out to a raw throughput of 2.5M packets per second.

The classifier includes four different modes that allow all IPSec selector matching operations to be supported, as well as general purpose packet matching for packet filtering purposes, for fragment re-assembly purposes, and for site blocking purposes. The classifier is not intended to serve as a general-purpose backbone router prefix-matching engine. As noted above, the classifier supports general IPSec policies, including rules with wildcards, ranges, and overlapping selectors. Matching does not require a linear search of overlapping rules, but instead occurs in a deterministic number of clock cycles.

Security and filtering policies are typically specified using flexible rule sets that allow generic matching to be performed on a set of broad packet selector fields. Individual rules support wildcard specification and ranges for matching parameters. In addition, multiple rules are allowed to overlap, and order-based matching is used to select the first applicable rule in situations where multiple rules apply.

Rule overlap and ordered matching add a level of complexity to hardware-based high-speed rule matching implementations. In particular, the requirement to select among multiple rules that match based on the order in which these rules are listed precludes direct implementation via high-speed lookup techniques that immediately find a matching rule independent of other possible matches.

Chips in accordance with the present invention provide a solution to the problem of matching in a multiple overlapping order-sensitive rule set environment involving a combination of rule pre-processing followed by direct high-speed hardware matching, and supports the full generality of security policy specification languages.

A pre-processing de-correlation step handles overlapping and possibly conflicting rule sets. This de-correlation algorithm produces a slightly larger equivalent rule set that involves zero intersection The new rule set is then implemented via high-speed hardware lookups. High performance algorithms that support incremental de-correlation are available in the art. Where CAM is used, a binarization step is used to convert range-based policies into mask-based lookups suitable for CAM arrays.

The function of the packet classifier is to perform IPSec-specified lookup as well as IP packet fragmentation lookup. These lookups are used by the distributor engine, as well as by the packet input engine (FIFO). In one embodiment, classification occurs based on a flexible set of selectors as follows:

Quintuple of <src IP addr, dst IP addr, src port, dst port, protocol>→104 bits match field Triple of <src IP addr, dst IP addr, IPSec SPI security parameter index>→96-bit match field Basic match based on <src IP addr, dst IP addr, protocol>→72-bit match field Fragment match based on <src IP, dst IP, fragment ID, protocol>→88-bit match field The result of packet classification is a classification tag. This structure holds IPSec security association data and per-flow statistics.

As noted above, a classifier in accordance with the present invention can be implemented using several different memory arrays for rule storage; each method involves various cost/performance trade-offs. The main implementations are external CAM-based policy storage; on-chip CAM-based policy storage; and external RAM (DRAM, SGRAM, SSRAM) based storage. Note that RAM-based lookups can only match complete (i.e. exact) sets of selectors, and hence tend to require more memory and run slower than CAM-based approaches. On-chip CAM offers an attractive blend of good capacity, high performance and low cost.

A preferred approach for cost-insensitive versions of a cryptography acceleration chip in accordance with the present invention is to implement an on-chip CAM and to provide a method to add more CAM storage externally. Rule sets tend to be relatively small (dozens of entries for a medium corporate site, a hundred entries for a large site, perhaps a thousand at most for a mega-site) since they need to be managed manually. The de-correlated rule sets will be somewhat larger, however even relatively small CAMs will suffice to hold the entire set.

A preferred method for cost-sensitive versions of a cryptography acceleration chip in accordance with the present invention is to implement DRAM-based classification, with a dedicated narrow DRAM port to hold classification data (i.e. a 32-bit SGRAM device). A higher performance alternative is to use external SSRAM, in which case a shared memory system can readily sustain the required low latency.

Both variants of packet classifier are described herein. The RAM-based variant, illustrated in FIG. 4 relies upon a classification entry structure in external memory. The RAM-based classifier operates via a hash-based lookup mechanism. RAM-based classification requires one table per type of match: one for IPSec quintuples, one for IPSec triples, and a small table for fragmentation lookups.

An important property of DRAM-based matching is that only exact matches are kept in the DRAM-based tables, i.e., it is not possible to directly match with wildcards and bit masks the way a CAM can. Host CPU assistance is required to dynamically map IPSec policies into exact matches. This process occurs once every time a new connection is created. The first packet from such a connection will require the creation of an exact match based on the applicable IPSec policy entry. The host CPU load created by this process is small, and can be further reduced by providing microcode assistance.

The input match fields are hashed to form a table index, which is then used to look up a Hash Map table. The output of this table contains indexes into a Classification Entry table that holds a copy of match fields plus additional match tag information.

The Hash Map and Classification Entry tables are typically stored in off-chip DRAM. Since every access to these tables involves a time-consuming DRAM fetch, a fetch algorithm which minimizes the number of rehash accesses is desirable. In most typical scenarios, a matching tag is found with just two DRAM accesses with a chip in accordance with the present invention.

To this effect, the hash table returns indexes to three entries that could match in one DRAM access. The first entry is fetched from the Classification Table; if this matches the classification process completes. If not, the second then the third entry are fetched and tested for a match against the original match field. If both fail to match, a rehash distance from the original hash map entry is applied to generate a new hash map entry, and the process repeated a second time. If this fails too, a host CPU interrupt indicating a match failure is generated. When this occurs, the host CPU will determine if there is indeed no match for the packet, or if there is a valid match that has not yet been loaded into the classifier DRAM tables. This occurs the first time a packet from a new connection is encountered by the classification engine.

Because the hash table is split into a two-level structure, it is possible to maintain a sparse table for the top-level Hash Map entries. Doing so greatly reduces the chances of a hash collision, ensuring that in most cases the entire process will complete within two DRAM accesses.

The following code shows the Hash Map table entries as well as the Classification Entries:

```c
/*
* Security Association Table - Classification Fields
* Used to look up an association per header.
* This table is accessed via a hash lookup structure, SATClassHash,
    defined next.
*
* Note that a single IPSec Security Association Database entry can
    occupy multiple
* SATClass entries due to wildcard and range support for various header
    fields.
*
*/
typedef struct SATClass__struct {
        u32     srcAddr;        /* IP source address */
        u32     dstAddr;        /* IP destination address */
        u16     srcPort;        /* TCP source port */
        u16     dstPort;        /* TCP destination port */
        u32     spi;            /* Security Parameter Index */
        u8      protocol;       /* Next level protocol */
        u32     tag;            /* Match tag */
} SATClass;
/*
* Hash table structure to look up an entry in the Security
* Association Table Classification
* Fields array. Each hash bucket holds up to three entries pointing
* to sat__class values.
* There are two hash table structures -- one for SPI-based lookup,
* one for inner header lookup.
*
* Overflows are handled via software. The odds of an overflow are
    small -- the
* average hash bucket occupancy is 0.5 entries per bucket,
* and an initial overflow is handled via a variable-distance rehash.
* Host software can set the rehash distance per hash entry to minimize
* overflow situations. An overflow would require 3 entries in the first
* hash bucket, followed by 3 entries in the second re-hashed
* bucket as well. This is very unlikely in practice.
*
* Multiple matching SATClass entries need to searched sequentially.
*/
typedef struct SATClassHash__struct {
        /* Up to three pointers (index) of SATClass entries */
        SATClass *Index0, *Index1, *Index2;
        u32 SATPresent:10;      /* 2 low order bits are # entries (0-3) */
                                /* 8 high order bits are rehash distance */
} SATClassHash;
```

In one embodiment of the present invention, a Hash Map structure entry is 128-bits long, and a Classification Entry is 192-bits long. This relatively compact representation enables huge numbers of simultaneous security associations to be supported in high-end systems, despite the fact that DRAM-based matching requires that only exact matches be stored in memory. As an example, the DRAM usage for 256K simultaneous sessions for IPSec quintuple matches is as follows:

Classification Entry memory: 24 Bytes*256K→6.1 Mbytes of DRAM usage Hash Map memory: Sparse (0.5 entries per hash bucket avg), 2*16 Bytes*256K→8M Bytes Total DRAM usage for 256K simultaneous sessions is under 16 Mbytes; 256K sessions would be sufficient to cover a major high-tech metropolitan area, and is appropriate for super high-end concentrator systems.

Since DRAM-based classification requires one table per type of match, the total memory usage is about double the above number, with a second table holding IPSec triple matches. This brings the total up to 32 Mbytes, still very low considering the high-end target concentrator system cost. A third table is needed for fragmentation lookups, but this table is of minimal size.

Another attractive solution is to use SSRAM to build a shared local memory system. Since SSRAM is well suited to the type of random accesses performed by RAM-based classification, performance remains high even if the same memory bank is used for holding both packet and classification data.

Further performance advances may be achieved using a CAM based classification engine in accordance with the present invention. The CAM based classifier is conceptually much simpler than the DRAM based version. In one embodiment, it is composed of a 104-bit match field that returns a 32-bit match tag, for a total data width of 136-bits. In contrast to DRAM-based classification, a common CAM array can readily be shared among different types of lookups. Thus a single CAM can implement all forms of lookup required by a cryptography acceleration chip in accordance with the present invention, including fragment lookups, IPSec quintuple matches, and IPSec triple matches. This is accomplished by storing along with each entry, the type of match that it corresponds to via match type field.

Because the set of IPSec rules are pre-processed via a de-correlation step and a binarization step prior to mapping to CAM entries, it is not necessary for the CAM to support any form of ordered search. Rather, it is possible to implement a fully parallel search and return any match found.

Figure 5:
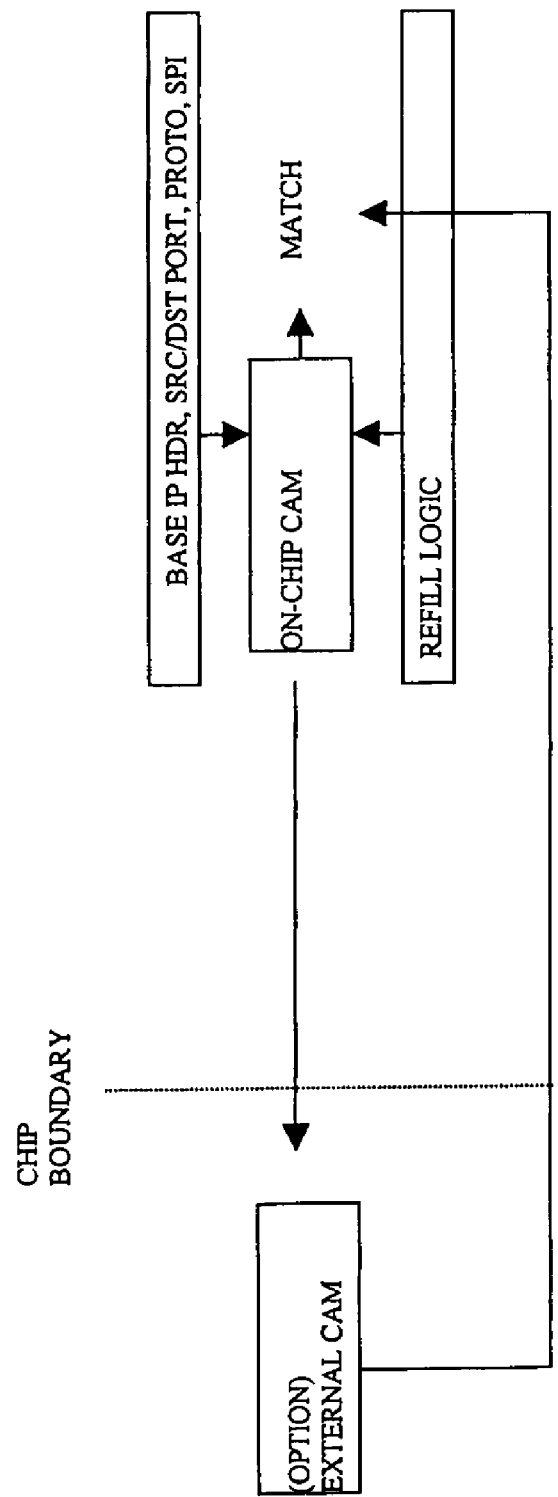
FIG. 5 is a block diagram illustrating a CAM-based packet classifier in accordance with one embodiment the present invention.

Referring to FIG. 5, the preferred implementation involves an on-chip CAM that is capable of holding 128 entries. Each entry consists of a match field of 106-bits (including a 2-bit match type code) and a match tag of 32-bits. An efficient, compact CAM implementation is desired in order to control die area. The CAM need not be fast; one match every 25 clock cycles will prove amply sufficient to meet the performance objective of one lookup every 400 ns. This allows a time-iterated search of CAM memory, and allows further partitioning of CAM contents into sub-blocks that can be iteratively searched. These techniques can be used to cut the die area required for the classifier CAM memory.

CAM matching is done using a bit mask to reflect binarized range specifiers from the policy rule set. In addition, bit masks are used to choose between IPSec quintuple, triple, fragment or non-IPSec basic matches.

Should on-chip CAM capacity prove to be a limitation, an extension mechanism is provided to access a much larger off-chip CAM that supports bit masks. An example of such a device is Lara Technologies' LTI1710 8Kx136/4Kx272 ternary CAM chip.

Typical security policy rule sets range from a few entries to a hundred entries (medium corporate site) to a maximum of a thousand or so entries (giant corporate site with complex policies). These rule sets are manually managed and configured, which automatically limits their size. The built-in CAM size should be sufficient to cover typical sites with moderately complex rule sets; off-chip CAM can be added to cover mega-sites.

CAM-based classification is extremely fast, and will easily provide the required level of performance. As such, the classifier unit does not need any pipelining, and can handle multiple classification requests sequentially.

Figure 6A:
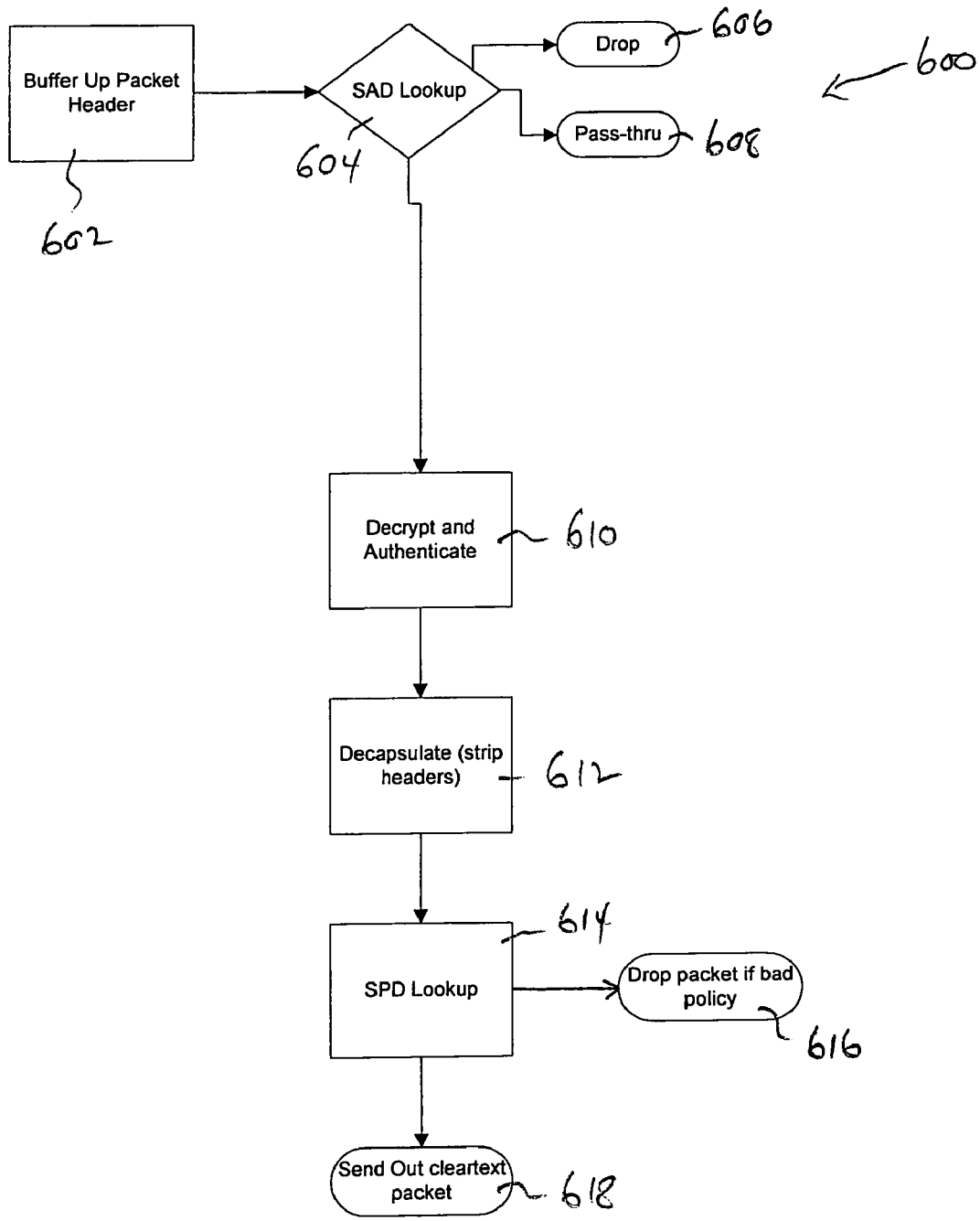
FIGS. 6A and 6B are flowcharts illustrating aspects of inbound and outbound packet processing in accordance with one embodiment the present invention.
Figure 6B:
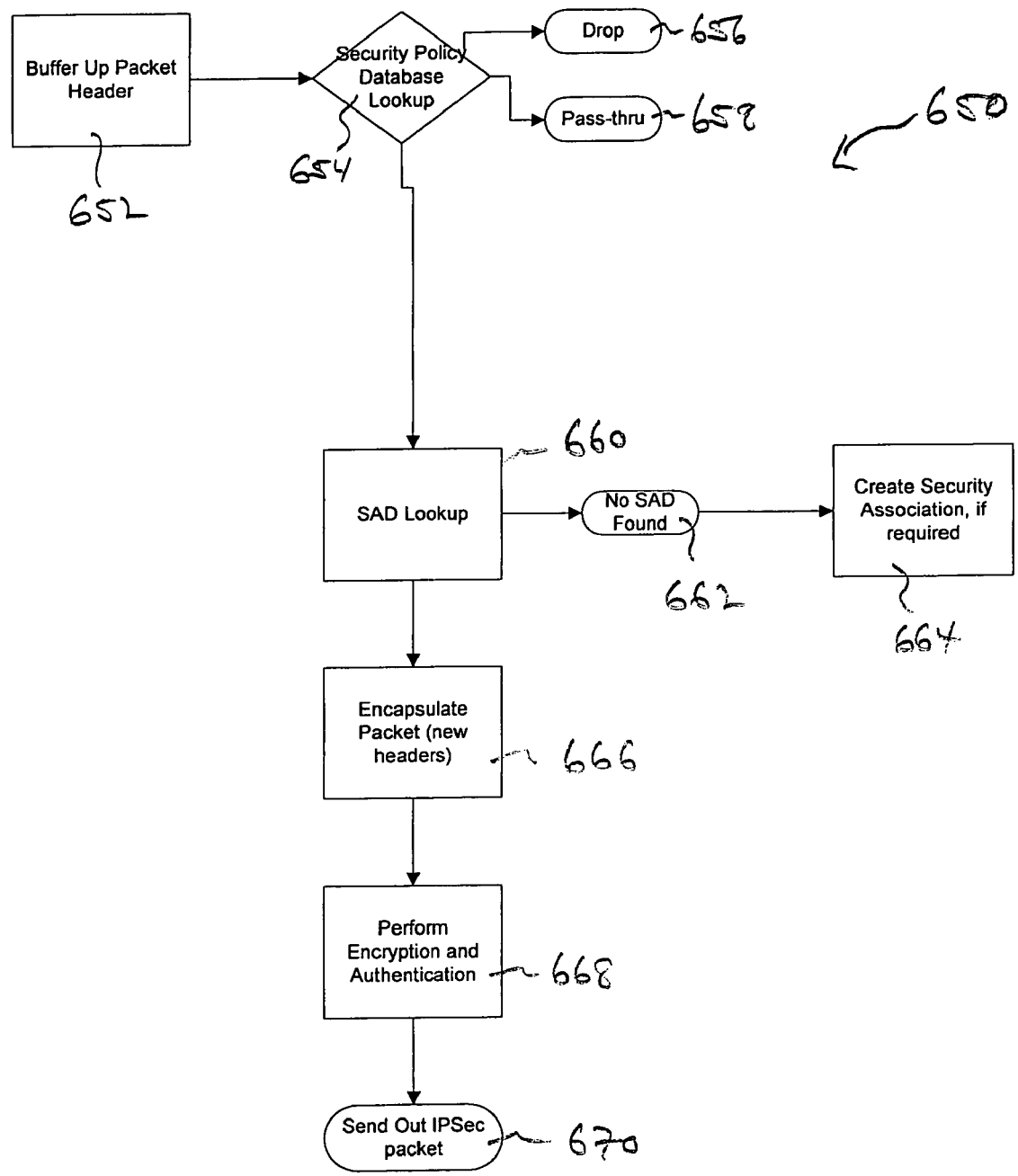

FIGS. 6A and 6B provide process flow diagrams showing aspects of the inbound and outbound packet processing procedures (including lookups) associated with packet classification in accordance with one embodiment of the present invention. FIG. 6A depicts the flow in the inbound direction (600). When an inbound packet is received by the packet classifier on a cryptography acceleration chip in accordance with the present invention, its header is parsed (602) and a SAD lookup is performed (604). Depending on the result of the SAD lookup and as specified by the resulting policy, the packet may be dropped (606), passed-through (608), or directed into the cryptography processing system. Once in the system, the packet is decrypted and authenticated (610), and decapsulated (612). Then, a SPD lookup is performed (614). If the result of the lookup is a policy that does not match that specified by the SAD lookup, the packet is dropped (616). Otherwise, a clear text packet is sent out of the cryptography system (618) and into the local system/network.

latency from the processing units. The structures are accessed by SA index, as generated by the packet classifier.

Partial contents for the SA Auxiliary structure are as shown in the following C code fragment:

```c
typedef struct SATAux_struct {
    u32 byteCount;           /* Total payload bytes processed via */
                             /* this entry (larger of crypto or auth bytes) */
    u64 expiry;              /* Expiry time or #bytes for this */
                             /* entry (checked per use) */
    u32 packetCount;         /* Stats - # packets processed via this entry */
    struct SATAux_struct *next;    /* Next IPSec Security Association for SA */
                             /* bundles */
    u32 seqNoHi;             /* Anti replay sequence number - "right" edge of window */
                             /* for outgoing packets, used for next sequence number */
    u64 seqWin;              /* Anti-replay sequence window (bit mask) */
    u32 peerAddr;            /* IPSec peer security gateway address */
    u32 spi;                 /* IPSec security parameter index */
    u8 originalProtocol;     /* pre-IPSec Protocol to which this SA applies */
    cryptoState algoCrypto;  /* Keys and other parameters for crypto */
    authState algoAuth;      /* Keys, state and other HMAC parameters */
    u8 enableSeq:1;          /* 1 to enable anti-replay sequence check */
    u8 crypto:2;             /* DES, 3DES, RC4, NONE */
    u8 auth:2;               /* MD5, SHA1, NONE */
    u8 format:2;             /* FORMAT_ESP, FORMAT_AH, FORMAT_AH_ESP */
    u8 tunnel:1;             /* 1 to enable tunneling, 0 to use transport adjacency */
    u8 discard:1;            /* Drop packet */
    u8 pass:1;               /* Pass packet through */
    u8 intr:1;               /* Interrupt upon match to this entry */
                             /* (useful for drop/pass) */
    u8 explicitiv:1;         /* Use implicit IV from SAdB as opposed to explicit */
                             /* IV from packet */
    u8 padnull:1;            /* Apply pad to 64-byte boundary for ESP */
                             /* null crypto upon IPSec output */
    u8 oldpad:1;             /* Old style random padding per RFC1829 */
} SATAux;
```

FIG. 6B depicts the flow in the outbound direction (650). When an outbound packet is received by the packet classifier on a cryptography acceleration chip in accordance with the present invention, its header is parsed (652) and a SPD lookup is performed (654). Depending on the result of the SPD lookup and as specified by the resulting policy, the packet may be dropped (656), passed-through (658), or directed into the cryptography processing system. Once in the system, a SAD lookup is conducted (660). If no matching SAD entry is found (662) one is created (664) in the IPSec Security Association Database. The packet is encapsulated (666), encrypted and authenticated (668). The encrypted packet is then sent out of the system (670) to the external network (WAN).

EXAMPLES

The following examples describe and illustrate aspects and features of specific implementations in accordance with the present invention. It should be understood the following is representative only, and that the invention is not limited by the detail set forth in these examples.

Example 1

Security Association Prefetch Buffer

The purpose of the SA buffer prefetch unit is to hold up to eight Security Association Auxiliary structures, two per active processing engine. This corresponds to up to two packet processing requests per engine, required to support the double-buffered nature of each engine. The double buffered engine design enables header prefetch, thus hiding DRAM The SA Buffer unit prefetches the security auxiliary entry corresponding to a given SA index. Given an SA index, the SA buffer checks to see if the SA Aux entry is already present; if so, an immediate SA Hit indication is returned to the distributor micro-engine. If not, the entry is pre-fetched, and a hit status is then returned. If all SA entries are dirty (i.e. have been previously written but not yet flushed back to external memory) and none of the entries is marked as retired, the SA Buffer unit stalls. This condition corresponds to all processing engines being busy anyway, such that the distributor is not the bottleneck in this case.

Example 2

Distributor Microcode Overview

In one implementation of the present invention, the distributor unit has a micro-engine large register file (128 entries by 32-bits), good microcode RAM size (128 entries by 96-bits), and a simple three stage pipeline design that is visible to the instruction set via register read delay slots and conditional branch delay slots. Microcode RAM is downloaded from the system port at power-up time, and is authenticated in order to achieve FIPS 140-1 compliance. In order to ensure immediate micro-code response to hardware events, the micro-engine is started by an event-driven mechanism. A hardware prioritization unit automatically vectors the micro-engine to the service routing for the next top-priority outstanding event; packet retiring has priority over issue.

```
Packet Issue Microcode:

//
// SA Buffer entry has been pre-fetched and is on-chip
// Packet length is available on-chip
//
test drop/pass flags; if set special case processing;
test lifetime; break if expired;      // reset if auth fails later
test byte count; break if expired;    // reset if auth fails later
assert stats update command;          // update outgoing sequence number
assert locate next engine command; if none, stall;
assert issue new packet command with descriptor ID, tag, length;
```

Since the distributor unit is fully pipelined, the key challenge is to ensure that any given stage keeps up with the overall throughput goal of one packet every 50 clock cycles. This challenge is especially important to the micro-engine, and limits the number of micro-instructions that can be expended to process a given packet. The following pseudo-code provides an overview of micro-code functionality both for packet issue and for packet retiring, and estimate the number of clock cycles spent in distributor micro-code.

```
Packet Retiring Microcode:

//
// SA Buffer entry has been pre-fetched and is on-chip
// Packet length is available on-chip. Packet has been authenticated
// by now if authentication is enabled for this flow.
//
if sequence check enabled for inbound, check & update sequence mask;
update Engine scheduling status;
mark packet descriptor as free; add back to free pool; // Schedule write
```

Since most distributor functions are directly handled via HW assist mechanisms, the distributor microcode is bounded and can complete quickly. It is estimated that packet issue will require about 25 clocks, while packet retiring will require about 15 clocks, which fits within the overall budget of 50 clocks.

Example 3

Advanced Classification Engine (ACE)

In one specific implementation of the present invention, a classification engine (referred to as the Advanced Classification Engine (ACE)) provides an innovative solution to the difficult problem of implementing the entire set of complex IPSec specified Security Association Database and Security Policy Database rules in hardware. The IETF IPSec protocol provides packet classification via wildcard rules, overlapping rules and conflict resolution via total rule ordering. The challenge solved by ACE is to implement this functionality in wirespeed hardware.

The Advanced Classification Engine of a chip in accordance with the present invention handles per-packet lookup based on header contents. This information then determines the type of IPSec processing that will be implemented for each packet. In effect, ACE functions as a complete hardware IPSec Security Association Database lookup engine. ACE supports full IPSec Security Association lookup flexibility, including overlapping rules, wildcards and complete ordering. Simultaneously, ACE provides extremely high hardware throughput. In addition, ACE provides value-added functions in the areas of statistics gathering and maintenance on a flexible per link or per Security Association basis, and SA lifetime monitoring. A separate unit within ACE, the Automatic Header Generator, deals with wirespeed creation of IPSec compliant headers.

ACE derives its extremely high end to end performance (5 Mpkt/s at 125 MHz) from its streamlined, multi-level optimized design. The most performance critical operations are handled via on-chip hardware and embedded SRAM memory. The next level is handled in hardware, but uses off-chip DRAM memory. The slowest, very infrequent frequent level of operations is left to host processor software. Key features of ACE include:

Full support for IPSec Security Association Database lookup, including wildcard rules, overlapping rules, and complete ordering of database entries.

Extremely high hardware throughput: Fully pipelined non-blocking out-of-order design. Four datagrams can be processed simultaneously and out of order to keep throughput at full rated wirespeed.

Flexible connection lookup based on src/dst address, src/dst ports, and protocol. Any number of simultaneously active packet classification values can be supported.

Hardware support for header generation for IPSec Encapsulating Security Protocol (ESP) and for IPSec Authentication Header (AH).

Full hardware header generation support for Security Association bundling—transport adjacency, and iterated tunneling.

Sequence number generation and checking on-chip.

Classification engine and statistics mechanisms available to non-IPSec traffic as well as to IPSec traffic.

Security Association lifetime checking based on byte count and elapsed wall clock time.

High quality random number generator for input to cryptography and authentication engines.

The input to ACE consists of packet classification fields: src/dst address, src/dst ports, and protocol. The output of ACE is an IPSec Security Association matching entry, if one exists, for this classification information within the IPSec Security Association Database. The matching entry then provides statistics data and control information used by automatic IPSec header generation.

A global state flag controls the processing of packets for which no matching entry exists—silent discard, interrupt and queue up packet for software processing, or pass through.

The matching table (SAT, Security Association Table) holds up to 16K entries in DRAM memory. These entries are set up via control software to reflect IPSec Security Association Database (SAdB) and Security Policy Database (SPdB) rules. The wildcard and overlapping but fully ordered entries of the SAdB and SPdB are used by control software to generate one non-overlapping match table entry for every combination that is active. This scheme requires software intervention only once per new match entry.

Figure 7:
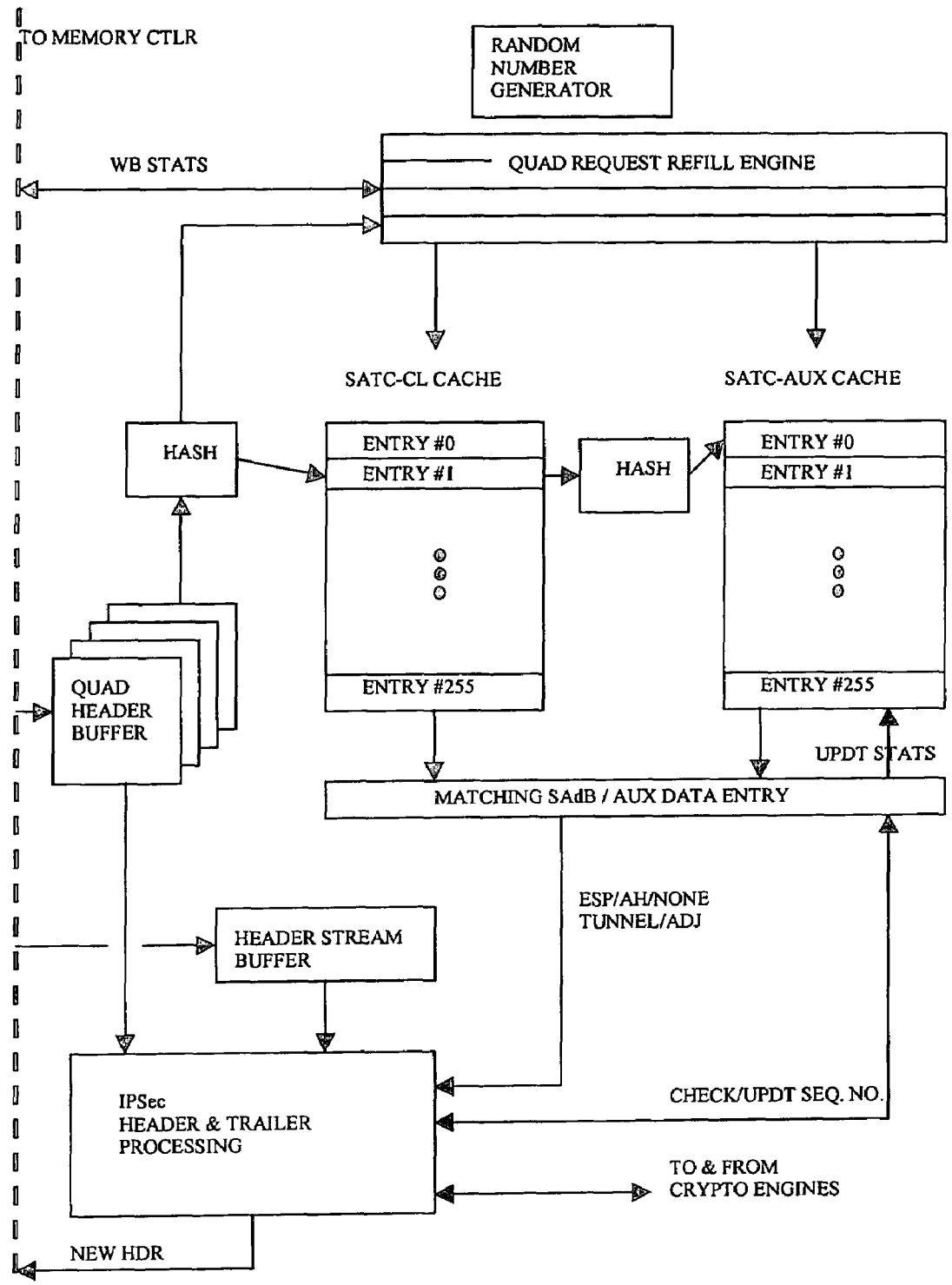
FIG. 7 shows a block diagram of a classification engine in accordance with one embodiment of the present invention, illustrating its structure and key elements.

FIG. 7 shows a block diagram of the ACE illustrating its structure and key elements. Major components of ACE are as follows:

Security Association Table Cache—Classification Field (SATC-CL): Used to look up a packet's classification fields on-chip. Each entry has the following fields:

| | SATC-CL SATC Classification Field Cache | | |
|---|---|---|---|
| Field name | Description | IPv6 size (bits) | IPv4 size (bits) |
| src@ | IP source address | 128 bits | 32 bits |
| dst@ | IP destination address | 128 bits | 32 bits |

-continued

SATC-CL SATC Classification Field Cache

| Field name | Description | IPv6 size (bits) | IPv4 size (bits) |
|---|---|---|---|
| protocol | High level protocol field | 8 bits | |
| src port | High level protocol source port | 16 bits | 16 bits |
| dst port | High level protocol destination port | 16 bits | 16 bits |
| Aux field ptr | Pointer to auxiliary data (stats, lifetime) | 16 bits | |
| peer@ | IP address of IPSec peer gateway | 128 bits | 32 bits |
| spi | IPSec Security Parameter Index | 32 bits | |
| ipsec format | ESP, AH or none; Tunnel or Adj | 3 bits | |

Security Association Auxiliary Data table Cache (SATC-AUX): Serves to hold statistics, etc. information on-chip in flexible fashion. An entry within SATC-AUX can serve multiple classification fields, allowing multiple combinations to be implemented for stats gathering. Each entry has the following fields:

SATC-AUX SATC Auxiliary Field Cache

| Field name | Description | IPv6 size (bits) | IPv4 size (bits) |
|---|---|---|---|
| Byte count | Total byte count for this entry | 32 bits | |
| Expiry time | Time entry expires | 32 bits | |
| # misses | SATC-CL misses for this entry | 32 bits | |
| # pkt | Total packet count for this entry | 32 bits | |
| next_spi | Next SPI for Iterated tunneling or Transport adjacency | 32 bits | |
| seqchk | Enable anti-replay sequence check | 1 bit | |
| seqno | Sequence number (output) or highest received seq number (input) | 32 bits | |
| seqmask | Anti-Replay window | 64 bits | |
| algo_info | Algorithm specific data (keys, pad lengths, Initial Vectors, etc) | 296 bits | |

Quad Refill Engine: handles the servicing of SATC-CL misses. When ever a miss occurs, the corresponding entry in the SATC-AUX is simultaneously fetched in order to maintain cache inclusion of all SATC-AUX entries within SATC-CL entries. This design simplifies and speeds up the cache hit logic considerably. The refill engine accepts and processes up to 4 outstanding miss requests simultaneously.

Quad Header Buffers: Holds up to 4 complete IPv4 headers, and up to 256 bytes each of 4 IPv6 headers. Used to queue up headers that result in SATC-CL misses. Headers that result in a cache hit are immediately forwarded for IPSec header generation.

Header streaming buffer: Handles overflows from the header buffer by streaming header bytes directly from DRAM memory; it is expected that such overflows will be exceedingly rare. This buffer holds 256 bytes.

Header/Trailer processing and buffer: For input datagrams, interprets and strips IPSec ESP or AH header. For output datagrams, adjusts and calculates header and trailer fields. Holds a complete IPv4 fragment header, and up to 256 bytes of an IPv6 header. Requires input from the cryptography modules for certain fields (authentication codes, for instance).

In addition to the above components, two data structures in DRAM memory are used by ACE for efficient operation. These are:

Complete Security Association Table—Classification Field (SAT-CL): holds classification data. This table backs up the on-chip SAT-CL Cache. Each entry is 475 bits aligned up to 60 bytes.

Complete Security Association Auxiliary Data table (SAT-AUX): holds auxiliary data. This table backs up the on-chip SAT-AUX Cache. Each entry is 617 bits, plus up to 223 bits of algorithm specific state (such as HMAC intermediate state), for a total of 105 bytes.

The following pseudo-code module describes major ACE input processing (received

```
Input Processing ( ) { /* Received datagram */
    Calculate hash value based upon
        (dst@,spi,protocol);
    /* Re-hash via predetermined sequence if collision occurs */
    Lookup field in Security Association Classification Cache;
    if (no match found) {
        /* Refill cache from DRAM memory */
        Calculate new hash for DRAM entry;
        /* Rehash in case of collision */
        /*
        * Out-of-order non-blocking execution
        */
        Schedule DRAM access (up to 4 outstanding fill req's);
        Move on to Input Processing ( ) of next datagram;
        /* When DRAM refill has completed */
        Lookup field in DRAM Security Association table;
        Pre-fetch DRAM Auxiliary table entry;
    }
    if (no match found) {
        /*
        * Datagram does not have a SAdB entry;
        * Process based on global flags.
        */
        if (nomatch_discard) silently drop packet;
        else if (nomatch_pass) send insecure packet out;
        else queue up packet and raise interrupt;
    }
    /* Datagram has a matching SAdB entry */
    Sanity check packet header fields, including protocol;
    Verify packet data against SAdB entry;
    if (seqchk) Perform anti-replay check;
    Perform lifetime check;
    Update statistics information;
    /* Aggressive writeback to minimize future miss latency */
    Schedule SATC-AUX entry for writeback to DRAM;
    Extract SAdB processing control & crypto parameters;
    Implement SAdB-specified processing on datagram;
    /* Double check packet SAdB match as soon as possible */
    Perform SAdB lookup procedure on
        (src@,dst@,srcport,dstport,protocol);
    Verify that original SPI is returned;
}
``` datagrams) operation:

The following pseudo-code module describes major ACE output processing

```
Output Processing ( ) { /* Received datagram */
    Calculate hash value based upon
        (src@,dst@,srcport,dstport,protocol);
    /* Re-hash via predetermined sequence if collision occurs */
    Lookup field in Security Association Classification Cache;
    if (no match found) {
```

-continued

```
/* Refill cache from DRAM memory */
Calculate new hash for DRAM entry;
/* Re-hash in case of collision */
/*
 * Out-of-order nonblocking execution
 */
Schedule DRAM access (up to 4 outstanding fill req's);
Move on to Input Processing ( ) of next datagram;
/* When DRAM refill has completed */
Lookup field in DRAM Security Association table;
Pre-fetch DRAM Auxiliary table entry;
}
if (no match found) {
    /*
     * Datagram does not have a SAdB entry; process based
     * Process based on global flags.
     */
    if (nomatch_discard) silently drop packet;
    else if (nomatch_pass) send insecure packet out;
    else queue up packet and raise interrupt;
}
/* Datagram has a matching SAdB entry */
Sanity check packet header fields, including protocol;
Generate sequence number;
Perform lifetime check;
Update statistics information;
/* Aggressive writeback to minimize future miss latency */
Schedule SATC-AUX entry for writeback to DRAM;
Extract SAdB processing control & crypto parameters;
Implement SAdB-specified processing on datagram;
}
```

(transmitted datagrams) operation:

ACE implements multiple techniques to accelerate processing. The design is fully pipelined, such that multiple headers are in different stages of ACE processing at any given time. In addition, ACE implements non-blocking out-of-order processing of up to four packets.

Out of order non-blocking header processing offers several efficiency and performance enhancing advantages. Performance-enhancing DRAM access techniques such as read combining and page hit combining are used to full benefit by issuing multiple requests at once to refill SATC-CL and SATC-AUX caches. Furthermore, this scheme avoids a problem similar to Head Of Line Blocking in older routers, and minimizes overall packet latency.

Because of the pipelined design, throughput is gated by the slowest set of stages.

| | |
|---|---|
| Header parsing | 2 clocks |
| Hash & SA Cache lookup | 2 clocks |
| Hash & SA Auxiliary lookup | 2 clocks |
| Initial header processing, anti-replay | 4 clocks |
| Statistics update | 3 clocks |
| Final header update | 6 clocks |

This works out to 19 clocks per datagram total with zero pipelining, within a design goal of 25 clocks per packet (corresponding to a sustained throughput of 5 Mpkt/s at 125 MHz). A simple dual-stage pipeline structure is sufficient, and will provide margin (average throughput of 10 clocks per header). The chip implements this level of pipelining.

ACE die area is estimated as follows based on major components and a rough allocation for control logic and additional data buffering:

| | |
|---|---|
| Control logic overhead | 50 Kg |
| Quad header buffer | 20 Kg |
| Quad refill controller with tag match | 50 Kg |
| SATC-CL cache | 130 Kg (single port) |
| SATC-AUX cache | 170 Kg (single port) |
| Stats engine | 10 Kg |
| Header/Trailer processor | 20 Kg |
| Prefetch buffering | 50 Kg |

Total estimated gate count is 500 Kg.

REFERENCES

The following references, which provide background and contextual information relating to the present invention, are incorporated by reference herein in their entirety and for all purposes:

"Efficient Fair Queuing using Deficit Round Robin", M. Shreedhar, G. Varghese, October 1996.

draft-ietf-pppext-mppe-03.txt Microsoft Point-To-Point Encryption (MPPE) Protocol, G. S. Pall, G. Zom, May 1999 draft-ietf-nat-app-guide-02.txt "NAT Friendly Application Design Guidelines", D. Senie, September 1999.

draft-ietf-nat-rsip-ipsec-00.tx] "RSIP Support for End-to-end IPSEC", G. Montenegro, M. Borella, May 19, 1999.

draft-ietf-ipsec-spsl-01.txt, "Security Policy Specification Language", M. Condell, C. Lynn, J. Zao, Jul. 1, 1999

"Random Early Detection Gateways for Congestion Avoidance", S. Floyd, V. Jacobson, August 1993 ACM Transactions on Networking "The IP Network Address Translator (NAT)", K. Egevang, P. Francis, May 1994.

"DEFLATE Compressed Data Format Specification version 1.3", P. Deutsch, May 1996.

"Specification of Guaranteed Quality of Service", S. Shenker, C. Partridge, R. Guerin, September 1997.

"IP Network Address Translator (NAT) Terminology and Considerations", P. Srisuresh, M. Holdrege, August 1999.

"IP Payload Compression using DEFLATE", R. Pereira, December 1998.

S. Kent, R. Atkinson, "Security Architecture for the Internet Protocol," RFC 2401, November 1998 (obsoletes RFC 1827, August 1995).

S. Kent, R. Atkinson, "IP Authentication Header," RFC 2402, November 1998 (obsoletes RFC 1826, August 1995).

S. Kent, R. Atkinson, "IP Encapsulating Payload," RFC 2406, November 1998 (obsoletes RFC 1827, August 1995).

Maughhan, D., Schertler, M., Schneider, M., and Turner, J., "Internet Security Association and Key Management Protocol (ISAKMP)," RFC 2408, November 1998.

Harkins, D., Carrel, D., "The Internet Key Exchange (IKE)," RFC 2409, November 1998.

"Security Model with Tunnel-mode IPsec for NAT Domains", P. Srisuresh, October 1999.

"On the Deterministic Enforcement of Un-Ordered Security Policies", L. Sanchez, M. Condell, February 14th 1999.

CONCLUSION

Although the foregoing invention has been described in some detail for purposes of clarity of understanding, those skilled in the art will appreciate that various adaptations and modifications of the just-described preferred embodiments can be configured without departing from the scope and spirit of the invention. For example, other cryptography engines may be used, different system interface configurations may be used, or modifications may be made to the packet processing procedure. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A device, comprising:
   a distributor unit in the device that distributes a plurality of packets in a data flow between a source and the device and a set of security association information for each of the plurality of packets according to a distribution scheme, wherein the distributor unit is configured to store per-flow IPSec information for each of the plurality of packets and to update a portion of the per-flow IPSec information for each packet in the plurality of packets; and
   a plurality of security processing engines in the device, coupled to the distributor unit, configurable to perform authentication, encryption, or decryption functions,
   wherein each of the plurality of security processing engines receives a packet and at least a portion of the set of security association information associated with the packet, and wherein the plurality of security processing engines process the plurality of packets in parallel.

2. The device of claim 1, wherein the plurality of packets are buffered prior to being processed by the plurality of security processing engines.

3. The device of claim 1, further comprising a classification module that determines security association information associated with each packet in the plurality of packets, wherein the classification module is configured to provide at least a portion of the security information associated with each packet to the distributor unit.

4. The device of claim 1, wherein the distributor unit and the plurality of security processing engines are on the same chip.

5. The device of claim 1, wherein the per-flow IPSec information includes a sequence number, an anti-replay window, and a lifetime of the security association.

6. The device of claim 1, wherein the security association information further includes an encapsulating security payload (ESP) encryption algorithm identifier and one or more ESP encryption keys.

7. The device of claim 6, wherein the security association information further includes an ESP authentication algorithm identifier and one or more ESP authentication keys.

8. The device of claim 1, wherein the security association information further includes an authentication header (AH) authentication algorithm identifier and one or more AH authentication keys.

9. The device of claim 1, wherein the security association information includes protocol mode information.

10. The device of claim 1, wherein the distribution scheme is a round-robin distribution scheme, wherein the distributor unit selects a next available security processing engine in a round-robin manner.

11. The device of claim 1, further comprising an order maintenance packet retirement unit.

12. The device of claim 11, wherein the distributor unit assigns packets for processing to a next available security processing engine regardless of the order received and the order maintenance packet retirement unit outputs the processed packets such that packet order is maintained.

13. The device of claim 1, wherein the device is a router.

14. The device of claim 1, wherein the device is a firewall.

15. The device of claim 1, wherein the device is a network communication device.

16. The device of claim 1, wherein the device system is a security gateway.

17. The device of claim 1, wherein the device is a server.

18. The device of claim 1, wherein the device is a network line card.

19. The device of claim 1, wherein the distributor unit is configured to update the stored per-flow IPSec information for a packet in the plurality of packets after the associated packet has been processed by one of the plurality of security processing engines.

20. The device of claim 1, wherein the distributor unit includes a memory configured to store the per-flow IPSec information associated with each packet being processing by the plurality of security processing engines.

21. The device of claim 20, wherein the memory is further configured to store the per-flow IPSec information associated with each packet being buffered by the plurality of security processing engine.

* * * * *

UNITED STATES PATENT AND TRADEMARK OFFICE
CERTIFICATE OF CORRECTION

PATENT NO.      : 7,600,131 B1                                          Page 1 of 1
APPLICATION NO. : 09/610798
DATED           : October 6, 2009
INVENTOR(S)     : Krishna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1456 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,600,131 B1 | Page 1 of 1 |
| APPLICATION NO. | : 09/610798 | |
| DATED | : October 6, 2009 | |
| INVENTOR(S) | : Krishna et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1456 days.

Column 5, line 35, please replace "Basic Features" with --Basic Features,--.

Claim 20, Column 22, line 41, please replace "processing" with --processed--.

Claim 21, Column 22, line 46, please replace "engine." with --engines.--.

Signed and Sealed this

Twelfth Day of October, 2010

David J. Kappos
*Director of the United States Patent and Trademark Office*